L. SWANK.
GATE LATCH.
APPLICATION FILED MAY 14, 1917.
1,258,624.
Patented Mar. 5, 1918.
2 SHEETS—SHEET 1.
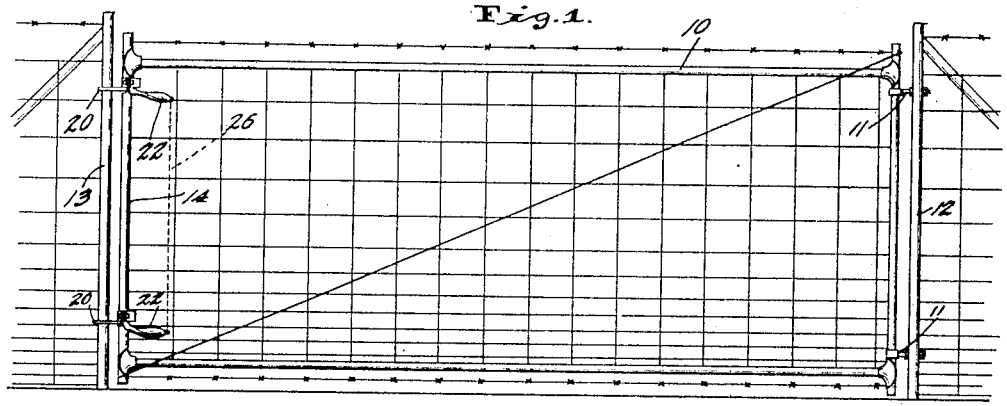
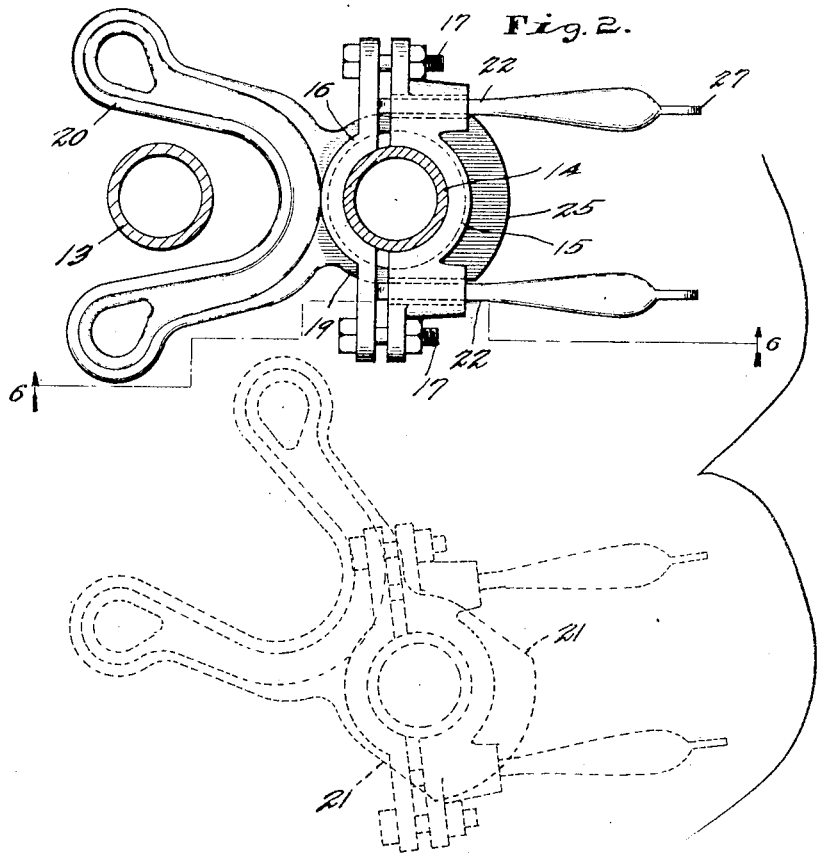
Witness
Frank A. Sahle
Inventor
Lafe Swank,
By
Hood & Ashby.
Attorneys

L. SWANK.
GATE LATCH.
APPLICATION FILED MAY 14, 1917.

1,258,624.

Patented Mar. 5, 1918.
2 SHEETS—SHEET 2.

Witness
Frank A. Fahle

Inventor
Lafe Swank,
By Hood & Schley
Attorneys

UNITED STATES PATENT OFFICE.

LAFE SWANK, OF ANDERSON, INDIANA, ASSIGNOR TO DWIGGINS WIRE FENCE COMPANY, OF ANDERSON, INDIANA, A CORPORATION OF INDIANA.

GATE-LATCH.

1,258,624.  Specification of Letters Patent.  Patented Mar. 5, 1918.

Application filed May 14, 1917. Serial No. 168,461.

*To all whom it may concern:*

Be it known that I, LAFE SWANK, a citizen of the United States, residing at Anderson, in the county of Madison and State of Indiana, have invented a new and useful Gate-Latch, of which the following is a specification.

It is the object of my invention to provide a gate latch which is carried by the gate itself, so that it can be applied before the gate is shipped, which coöperates with any suitable fence post, which permits opening of the gate in either direction and causes an automatic latching when the gate is closed, and which is made practically wholly of rough castings with a minimum of machining, so that the cost of its production is minimized.

Figure 3:
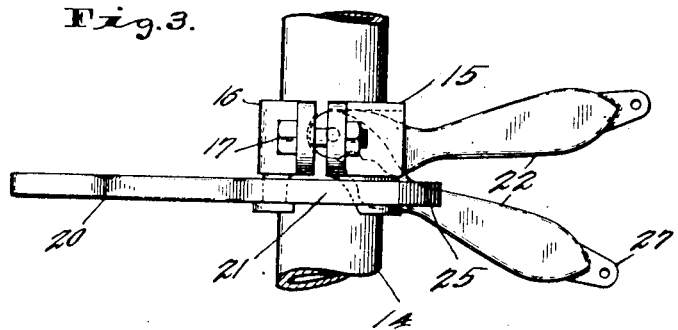
Figure 4:
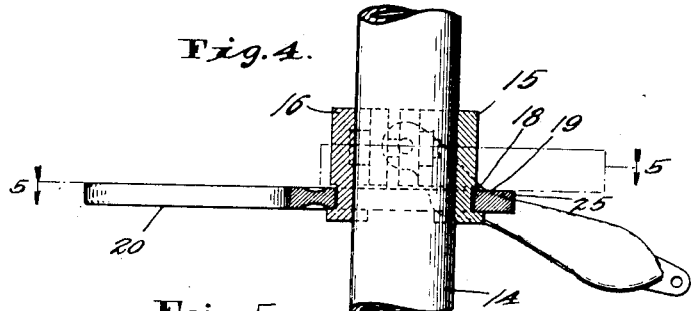
Figure 5:
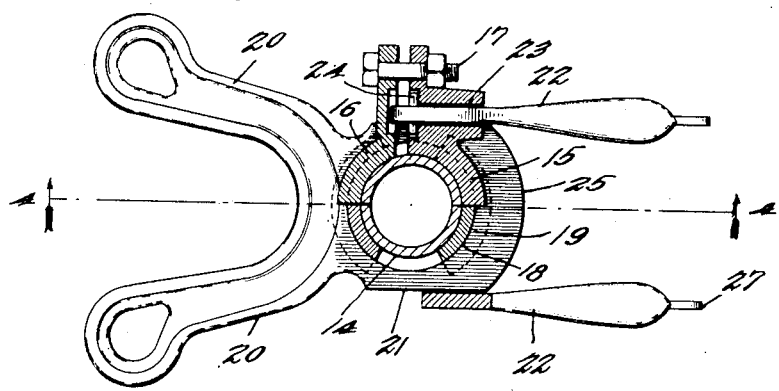
Figure 6:
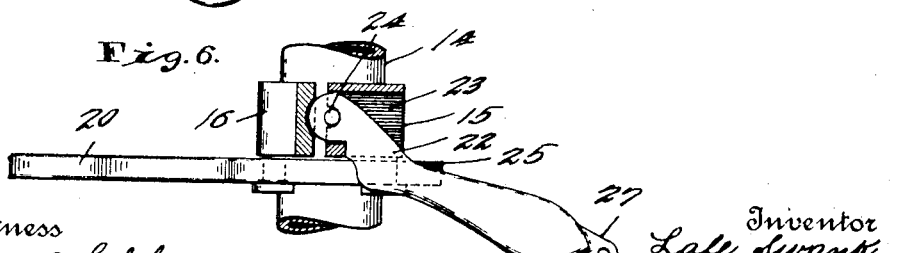

The accompanying drawings illustrate my invention. Figure 1 is an elevation of a gate and fragments of a fence equipped with a gate latch embodying my invention; Fig. 2 is a plan of my gate latch, with the end bar of the gate and the gate post in section, showing in full lines the latch in locking position and in dotted lines the latch with the gate open but approaching closed position; Fig. 3 is a side elevation of my gate latch, together with a fragment of the end bar of the gate; Fig. 4 is a vertical section through such gate latch, taken substantially on the line 4—4 of Fig. 5; Fig. 5 is a section on the line 5—5 of Fig. 4; and Fig 6 is a section on the line 6—6 of Fig. 2.

The gate 10 is of any suitable construction, mounted by hinges 11 on a carrying fence post 12 so that its free end coöperates with another fence post 13, with which the latches carried by the vertical end bar 14 at the free end of the gate coöperate.

There are preferably two latches, one near the top and one near the bottom, to prevent skewing of the gate by animals seeking to pass through, these latches being mounted on the end bar 14. Each latch consists of two mating clamping members 15 and 16 clamped on such end bar by clamping bolts 17 and when so clamped in place providing a circumferential groove 18 in which is mounted a ring 19 which forms the carrying end of the latch member and is provided with a projecting fork 20 which receives between its prongs the fence post 13 when the gate is closed. The ring 19 may be turned in either direction about the axis of the end bar 14 to permit the fork 20 to be withdrawn from the fence post 13 on either side of the gate is opened, but unless such ring 19 is thus turned the fork 20 prevents the opening of the gate. In order to prevent turning of the ring 19 save when proper, such ring has two opposite segments cut off to leave straight locking edges 21 substantially parallel to the medial line of the fork 20, and with these locking edges 21 coöperate to locking bars 22 projecting through openings 23 in the two sides of the clamping member 15 and pivoted therein on cross pins 24. The free ends of the locking bars 22 are weighted, so that they tend to drop to the position shown in Figs. 4 and 6, in which position they project down past the locking edges 21 and thereby prevent the ring 19 from turning. When either locking bar 22 is raised, it clears the plane of the ring 19, so that the rear flange 25 of such ring, opposite the fork 20, may pass under such raised locking bar to swing the fork 20 as indicated in dotted lines in Fig. 2, thus permitting opening of the gate toward the side on which such raised locking bar 22 is located. The raised locking bar rests on the flange 25 when the ring 19 is thus turned, and slides thereon. When the gate is returned to closed position, the fork 20 receives the gate post 13 and is turned thereby to the normal position, shown in full lines in Figs. 2 and 5. By this movement of the fork 20 the ring 19 is returned to its normal position, and the raised locking bar 22 slides off the flange 25 down past its associated locking edge 21 to prevent further turning of such ring until one or the other of the locking bars 22 is again raised. When there are two latches, at the top and bottom of the gate, the corresponding locking bars 22 of such two latches may be suitably connected at their free ends, as by wires 26 passing through holes in lugs 27 with which such free ends are provided.

In assembling my latch, the locking bars 22 are put through the holes 23 and the cross pins 24 are inserted. Then the two locking members 15 and 16 are put together and the ring 19 slipped in place in the groove 18, there being sufficient space between the members 15 and 16 so that the ring 19 may be put in place in such groove 18 although it is made in one piece. Then the clamping members 15 and 16 are spread apart sufficiently to hold the ring 19 in place in the groove 18, and such two clamping members are slipped in place on the end bar 14 and claimped there by the bolts 17.

I claim as my invention:

1. A gate latch, comprising two mating clamping members for clamping upon the end bar of a gate, said clamping members being provided with an external circumferential circular groove, a one-piece ring mounted in said groove and provided with a projecting fork for receiving between its prongs the associated gate post, said ring being segmentally cut away to provide two opposite locking edges, and locking bars pivotally mounted in one of said clamping members and on opposite sides of the plane of the gate and tending to swing by gravity into the plane of the ring to coöperate with the respective locking edges to prevent turning of the ring.

2. A gate latch, comprising two mating clamping members for clamping upon the end bar of a gate, said clamping members being provided with an external circumferential circular groove, a ring mounted in said groove and provided with a projecting fork for receiving between its prongs the associated gate post, said ring being segmentally cut away to provide two opposite locking edges, and locking bars pivotally mounted in one of said clamping members and on opposite sides of the plane of the gate and tending to swing by gravity into the plane of the ring to coöperate with the respective locking edges to prevent turning of the ring.

3. A gate latch, comprising two mating clamping members for clamping upon the end bar of a gate, said clamping members being provided with an external circumferential circular groove and with internal pivot recesses, a ring mounted in said groove and provided with a projecting fork for receiving between its prongs the associated gate post, said ring being segmentally cut away to provide two opposite locking edges, and locking bars projecting through holes in one of said clamping members above said ring and provided with cross pins coöperating with such pivot recesses to prevent the clamping members from being withdrawn and to provide a pivotal mounting, said locking bars tending to swing by gravity into the plane of the ring to coöperate with the respective locking edges to prevent turning of the ring.

4. A gate latch, comprising two mating clamping members for clamping upon the end of a gate, said clamping members being provided with an external circumferential circular groove and with internal pivot recesses, a one-piece ring mounted in said groove and provided with a projecting fork for receiving between its prongs the associated gate post, said ring being segmentally cut away to provide two opposite locking edges, and locking bars projecting through holes in one of said clamping members above said ring and provided with cross pins coöperating with such pivot recesses to prevent the clamping members from being withdrawn and to provide a pivotal mounting, said locking bars tending to swing by gravity into the plane of the ring to coöperate with the respective locking edges to prevent turning of the ring.

In witness whereof I have hereunto set my hand at Anderson, Indiana, this 11 day of May, A. D. one thousand nine hundred and seventeen.

LAFE SWANK.

Copies of this patent may be obtained for five cents each, by addressing the "Commissioner of Patents, Washington, D. C."